Feb. 12, 1957

R. LUCIEN 2,781,106

DISC BRAKES FOR VEHICLE WHEELS

Filed Feb. 1, 1955

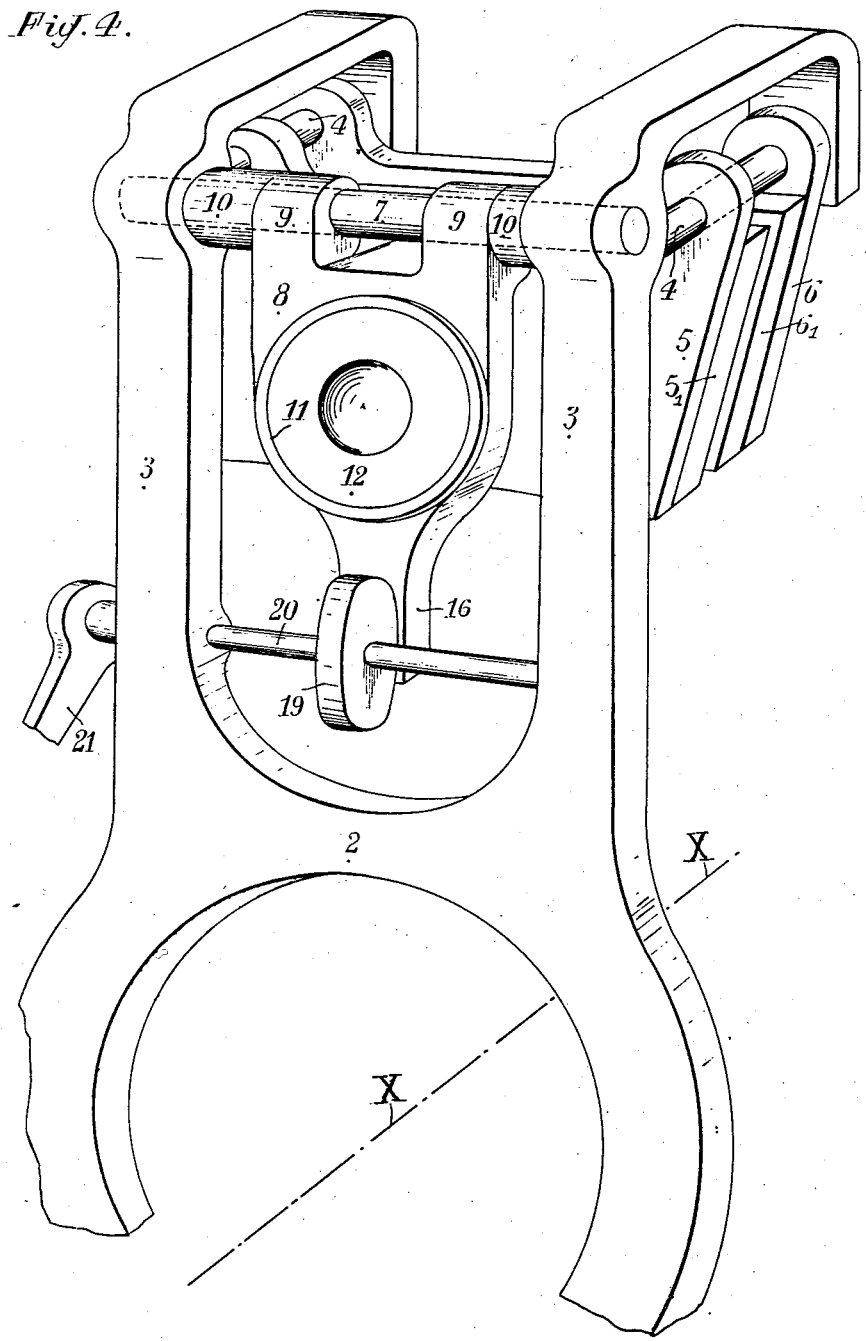

United States Patent Office 2,781,106
Patented Feb. 12, 1957

2,781,106

DISC BRAKES FOR VEHICLE WHEELS

René Lucien, Paris, France

Application February 1, 1955, Serial No. 485,554

Claims priority, application France October 16, 1954

5 Claims. (Cl. 188—106)

The usual types of disc brakes have the disadvantage that they are not silent by reason of the lack of rigidity of the disc or discs which should slide parallel to the axis of the wheel when the braking pressure is applied to them.

The object of the present invention is to provide a disc brake which overcomes this drawback, and which in addition has the following advantages:

An emergency mechanical control may be provided in addition to the hydraulic brake control;

The brake linings may be easily replaced;

The simplicity of the assembly permits of economical manufacture.

The brake in accordance with the invention is characterised in that it comprises a disc which is entirely fixed to the wheel, that is to say it rotates with the wheel and is prevented from being displaced parallel to the axis of the wheel; a support fixed with respect to the vehicle on which are adapted to move, parallel to the axis of the wheel, segments carrying brake linings arranged on each side of the disc, and means for causing the two segments to move towards each other and for pressing the said segments against the said disc.

In accordance with the invention, the said means comprise the utilisation of a fluid under pressure and, as an auxiliary, of a purely mechanical power transmission system.

Further features of the brake in accordance with the invention will become apparent from the discription which follows of a form of embodiment given by way of example without limitation and illustrated in the attached drawings, in which:

Fig. 4 is a view in perspective, in which one of the component members has been removed for the sake of clearness.

Figure 1:
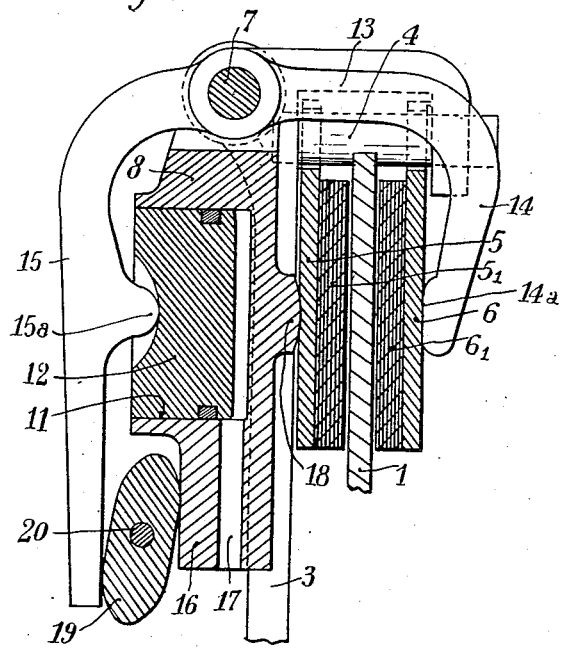
Fig. 1 is a view in cross-section along the axis of the wheel of the essential parts of the brake.
Figure 2:
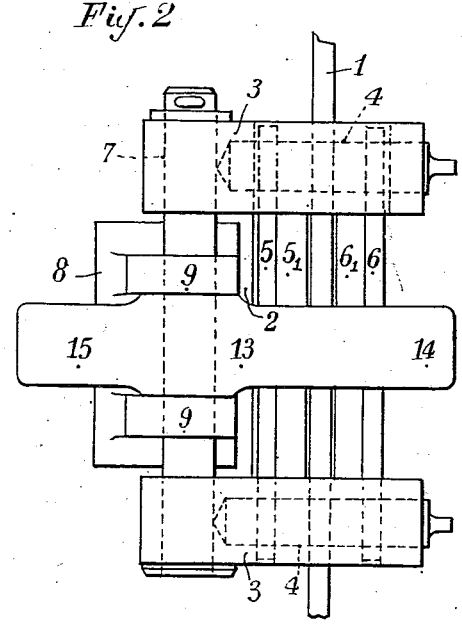
Fig. 2 is a view in plan of Fig. 1.

To the wheel, not shown, which rotates about the axis X—X, there is fixed a disc 1. A support 2, which is fixed with respect to the vehicle, is mounted for example on the shaft around which the wheel rotates, if the wheel is freely-rotating. The support 2, of which only one half is shown, the other being symmetrical with respect to the axis of the wheel, has the shape of a fork, the two branches 3 of which are folded back at their extremities in the form of a U. Between the two branches of each U and externally of the disc 1, there are arranged two cylindrical rods 4, 4, on which are adapted to slide two braking segments 5, 6, provided with friction linings $5_1$, $6_1$, facing each other on opposite sides of the disc 1. The two branches 3 of the fork carry a shaft 7 about which a member 8 is adapted to oscillate, this member carrying two journal bearings 9, 9, retained between two rings 10, 10. The member 8 is bored so as to form a cylinder 11 in which a piston 12 is adapted to move. A U-shaped member 13 is mounted so as to oscillate on the shaft 7 between the two bearings 9, 9 (the member 13 is not shown in Figs. 3 and 4) the two arms 14, 15 enclosing the two segments 5, 6, and the member 8, the arm 14 having a shouldered portion 14a and the arm 15 a shouldered portion 15a.

The member 8 is extended to form a tail 16 in the shape of a conduit 17 which communicates with the cylinder 11. This member is further provided with a boss 18.

The operation of the brake is as follows: a fluid under pressure is admitted into the conduit 17; the piston 12 and the base of its cylinder tend to separate from each other. During this movement, the piston 12 applies a pressure to the shouldered portion 15a, whilst the boss 18 is forced against the segment 5 which then applies the friction lining $5_1$ against the disc 1. At the same time, the effort exerted by the piston 12 on the arm 15 causes the member 13 to oscillate about the shaft 7 and this causes the shouldered portion 14a to be forced against the segment 6 so that the disc 1 is equally pressed on its two faces by the friction linings $5_1$, $6_1$, with a pressure proportional to that of the fluid.

Figure 3:
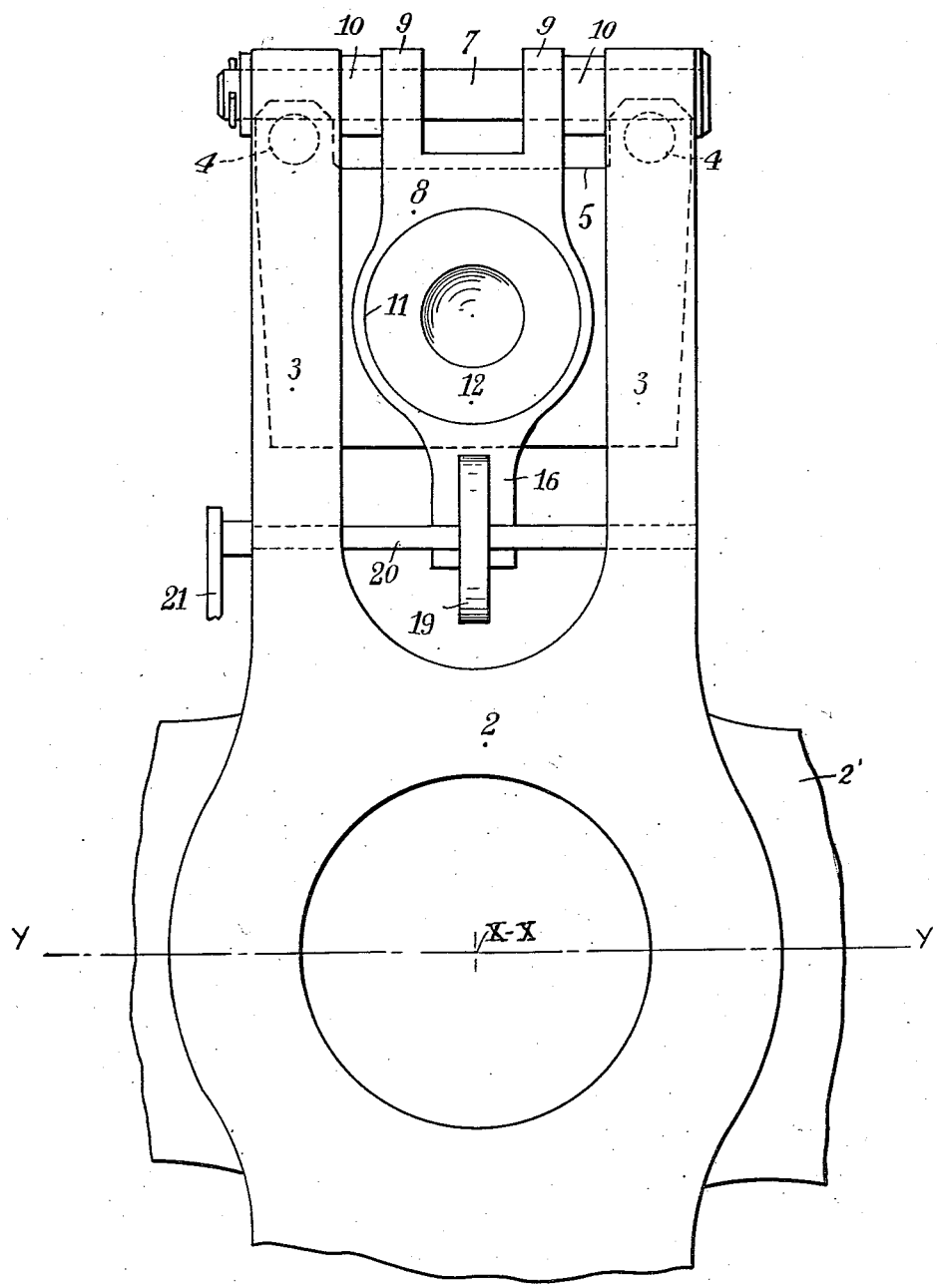
Fig. 3 is a view looking on the end of the shaft.

On the same support 2, there may be mounted an identical braking arrangement disposed diametrically opposite to that which has just been described and as indicated in Figure 3 with respect to the axis Y—Y, or any number of such devices may be provided around the axis of the wheel as shown by the broken section of the support 2'.

In order to maintain the braking effect on the vehicle when stationary, or to permit of braking in case of failure of the fluid pressure, there is provided, between the arm 15 and the tail 16, a cam member 19 adapted to move about a fixed axis 20, under the action of a mechanical transmission terminating, for example, in a lever 21. The cam 19 applies the member 8 against the segment 5 and, at the same time, by applying pressure on the arm 15, forces the arm 14 against the segment 6.

In a different form of construction of the fixed support 2, the latter may be given the general shape of a surface of revolution having as its axis the axis of the wheel, but suitably shaped, for example by punching, at the point of contact with the oscillating members in such manner as to permit of their housing and their movement, thus protecting, at least on one side, the whole braking device, whatever may be the number of braking segments provided around the shaft.

If complete protection is desired, this surface of revolution may be completed by a steel sheet member shaped to form a cover and arranged on the side opposite to the said support with respect to the braking device, the assembly then constituting a casing which completely encloses the arrangement.

What I claim is:

1. A vehicle wheel brake comprising in combination a disc entirely fixed with respect to the said wheel, a fork-shaped support fixed with respect to the vehicle; a shaft carried by said support, the axis of said shaft being at right angles to the axis of the wheel; at least one pair of braking segments movable upon said support and parallel to the axis of the wheel and disposed on opposite sides of said disc; at least one first member rotatably movable about the axis of said shaft and adapted to be applied against one of said segments upon its face opposite to that which faces the disc; a second member of U-shape rotatably movable about the axis of said shaft, the two branches of said second member encompassing at the same time said first member and said pair of segments; and a motor operated by fluid under pressure and interposed between said first member and one of the branches of said second member, whereby an extension of said motor applies it on the one hand against one of said segments and, on the other hand, against one of the branches of said U-shaped member so as to cause the latter to pivot about its axis and thus to cause its other branch to apply a pressure against the other said segment.

2. A wheel brake in accordance with claim 1, comprising, between the said first member and one of the branches of the said second member, a fixed axis, at a right angle to the axis of the wheel, a cam rotatably movable about said fixed axis and mechanical means for operating said cam.

3. A wheel brake in accordance with claim 1, in which the said motor is constituted by a cylinder formed in the said first member and open at the side opposite to the said segment, and by a piston adapted to move in the said cylinder under the pressure of compressed fluid, in the direction of one of the branches of the said U-shaped member.

4. A wheel brake in accordance with claim 1, in which the said fixed support comprises at least one fork member, the two branches of which carry a shaft perpendicular to the axis of the said wheel and about which shaft are rotatably mounted the said first member and said second member, the said branches being folded twice at right angles at their extremities and each carrying a rod parallel to the axis of the said wheel and engaged in corresponding holes formed in the said segments.

5. A wheel brake in accordance with claim 4, in which the said fixed support comprises a series of forked members angularly distributed around the axis of the said wheel and each carrying the members of the braking system.

References Cited in the file of this patent
UNITED STATES PATENTS
2,689,024    Trevaskis _____ Sept. 14, 1954